US008174499B2

(12) United States Patent
Yoshida

(10) Patent No.: US 8,174,499 B2
(45) Date of Patent: May 8, 2012

(54) NAVIGATION APPARATUS

(75) Inventor: Masato Yoshida, Nagoya (JP)

(73) Assignee: DENSO CORPORATION, Kariya (JP)

( * ) Notice: Subject to any disclaimer, the term of this patent is extended or adjusted under 35 U.S.C. 154(b) by 407 days.

(21) Appl. No.: 12/588,228

(22) Filed: Oct. 8, 2009

(65) Prior Publication Data

US 2010/0100846 A1    Apr. 22, 2010

(30) Foreign Application Priority Data

Oct. 17, 2008   (JP) .................................. 2008-268764

(51) Int. Cl.
G09G 5/08        (2006.01)
(52) U.S. Cl. .......................... 345/157; 715/851; 715/701
(58) Field of Classification Search .......... 345/156–169; 715/701, 702, 810, 851, 818, 855–862
See application file for complete search history.

(56) References Cited

U.S. PATENT DOCUMENTS

| | | | | |
|---|---|---|---|---|
| 6,219,032 B1 * | 4/2001 | Rosenberg et al. | ........... | 345/157 |
| 6,836,723 B2 * | 12/2004 | de Silva | ......................... | 701/538 |
| 7,042,370 B2 * | 5/2006 | Morie | ....................... | 340/995.14 |
| 7,991,546 B2 * | 8/2011 | Iao | .................................. | 701/426 |
| 2005/0099388 A1 | 5/2005 | Matsumoto | | |

FOREIGN PATENT DOCUMENTS

| | | |
|---|---|---|
| JP | A-2002-031539 | 1/2002 |
| JP | A-2002-365060 | 12/2002 |
| JP | A-2003-097964 | 4/2003 |
| JP | A-2003-107990 | 4/2003 |
| JP | A-2004-226301 | 8/2004 |
| JP | A-2005-141674 | 6/2005 |
| JP | A-2005-181572 | 7/2005 |
| JP | A-2005-249560 | 9/2005 |

* cited by examiner

Primary Examiner — Jimmy H Nguyen
(74) Attorney, Agent, or Firm — Posz Law Group, PLC

(57) ABSTRACT

A navigation apparatus is disclosed. The navigation apparatus includes a remote control device having a manipulation member and a force generator. The manipulation member is movable in response to user's manipulation and enables the user to point to a position on a display screen of the display device remotely. The force generator applies a force to the manipulation member against the manipulation of the manipulation member. The navigation apparatus sets content of the force based on an arrangement of an item image on the display screen, so that the force causes the pointed position to be attracted toward a fixed item image when the pointed position is located around the fixed item image, while the first force does not cause the pointed position to be attracted toward an on-map item image, which is superimposed on a map image.

9 Claims, 6 Drawing Sheets

NAVIGATION APPARATUS

CROSS REFERENCE TO RELATED APPLICATION

The present application is based on Japanese Patent Application No. 2008-268764 filed on Oct. 17, 2008, disclosure of which is incorporated herein by reference.

BACKGROUND OF THE INVENTION

1. Field of the Invention

The present invention relates to a navigation apparatus including a remote control device.

2. Description of Related Art

Modern vehicles are equipped with an in-vehicle apparatus such as a navigation apparatus and the like. There is known a system that includes an input device and a display device. Using the system, a user can operate the in-vehicle apparatus by manipulating the input device through pointing to a certain position on an operation window displayed on a display screen.

Regarding the above type of system, in order to minimize movement of viewpoint of a driver, it may be preferable to place the display screen in front of the driver and as far as possible from the driver. Further, it is may be preferable to place the input device within a driver arm's reach, and preferable that a driver be not required to take a look at the input device to manipulate the input device. In view of the above, a navigation apparatus having a remote control device has been put to practical use, the remote control device being provided separately from the display screen.

The system having such a remote control device typically employs an operation method including: manipulating the remote control device to operate position of a cursor indicative of the pointed position on an operation widow; moving the cursor to an icon to which a command directed to the navigation apparatus is assigned; and performing a selection manipulation on the icon. In the above system, the remote control device includes a manipulation member for receiving user manipulation. The remote control device tactually assists the user manipulation by applying a force to the manipulation member against the user maculation so that the force depends on display content on the display screen, thereby improving operability.

For example, JP-2002-31539A discloses the following technique. A movable region is set to correspond to a region adjacent to a guidance route on a map on the display screen. A resistance force is generated against an operation of scrolling the map to an outside of the movable region, in other words, against an operation of scrolling the map in a direction not along the guidance route, thereby improving operability in scrolling the map.

Further, there is also known the following technique. A selection item image such as an icon and the like is displayed on an operation menu window or the like. When a pointed position is located around the selection item image, a force is applied to a manipulation member to assist user operation such that the pointed position is attracted toward the selection item image. Through the above manner, it may be possible to facilitate an operation of pointing to the selection item image, and may be possible to improve operability.

The navigation apparatus typically displays an icon for execution of a command to provide information on a particular facility on the map or an icon for execution of a command to provide traffic information on a particular point. Such icons are superimposed on a map image so as be displayed at corresponding positions on the map. Upon user selection, the navigation apparatus provide the information corresponding to the selected icon.

The inventor of the present application has revealed that the following difficulty may arise when an assist force causing the pointed position to be absorbed in an icon is set to not only icon displayed in an operation menu window but also to an icon that is superimposed on the map image.

For example, when many icons for peripheral facility or traffic information are displayed on a map image and when a cursor is moved on the map image, the pointed position is attracted toward an icon contrary to user intentions every time the cursor passes by the icon. In such a case, operability is worsened rather than improved. This is because a smooth operation of moving a cursor for the purpose other than selecting an icon on the map image becomes difficult. For example, a smooth operation of moving a cursor to scroll the map for the purpose of displaying a different area becomes difficult.

Further, a typical navigation apparatus automatically scrolls a map image in response to movement of the subject vehicle, and moves icons on the map image in accordance with the scroll of the map image. In the above case, the movement of icons requires re-arrangement of data of the force to be set to each icon in relation to timing of the icon movement. The processing load related to the force setting can increase.

The above difficulty, e.g., the worsening of operability and the increasing of processing load, becomes more notable when many icons are closely arranged on a map image.

SUMMARY OF THE INVENTION

In view of the above and other points, it is an objective of the present invention to provide a navigation apparatus that can facilitate an operation of a selection item image on a display screen, the operation being performed using a remote control device.

According to an aspect of the present invention, there is provided a navigation apparatus (i) mountable to a movable body, (ii) configured to cause a display device to display a map image on a display screen, the map image covering an area around a focus spot, and (iii) configured to scroll the map image to change the area covered by the map image in response to movement of the focus spot. The navigation apparatus includes a selection item image display section, a remote control device, and a force setting section. The selection item image display section causes the display device to display a selection item image to receive a predetermined command execution instruction from a user. The selection item image includes: an on-map selection item image that is superimposed on the map image and is scrollable together with the map image; and a fixed selection item image that is fixedly displayed on the display screen so as be arranged on the map image or in a periphery of the map image. The remote control device includes: a manipulation member that is movable in response to user's manipulation of the manipulation member, the manipulation of the manipulation member causing a remote control operation to point to a position on the display screen remotely from the display screen; and a force generator that is configured to apply a force to the manipulation member against the manipulation of the manipulation member. The force setting section sets content of the force to be applied to the manipulation member by the force generator, based on an arrangement of the selection item image on the display screen, such that the force includes a first force, which causes the pointed position to be attracted toward a position of the fixed selection item image on the display screen when the pointed position is located around the fixed selection item image, while the first force does not cause the pointed position to be attracted toward a position of the on-map selection item image on the display screen.

According to the above navigation apparatus, it is possible to facilitate operation of the selection item image on the display screen, the operation being performed using the remote control device. For example, it is possible to facilitate the pointing to the fixed selection item image and provide operability comfortable for user. Further, it is possible to prevent the pointed position from being absorbed contrary to user intentions and it is possible to avoid worsening operability, because the first force does not cause the pointed position to be attracted toward a position of the on-map selection item image.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

The exemplary embodiments are described below with reference to the accompanying drawings.

[Configuration of Navigation Apparatus]

Figure 1:
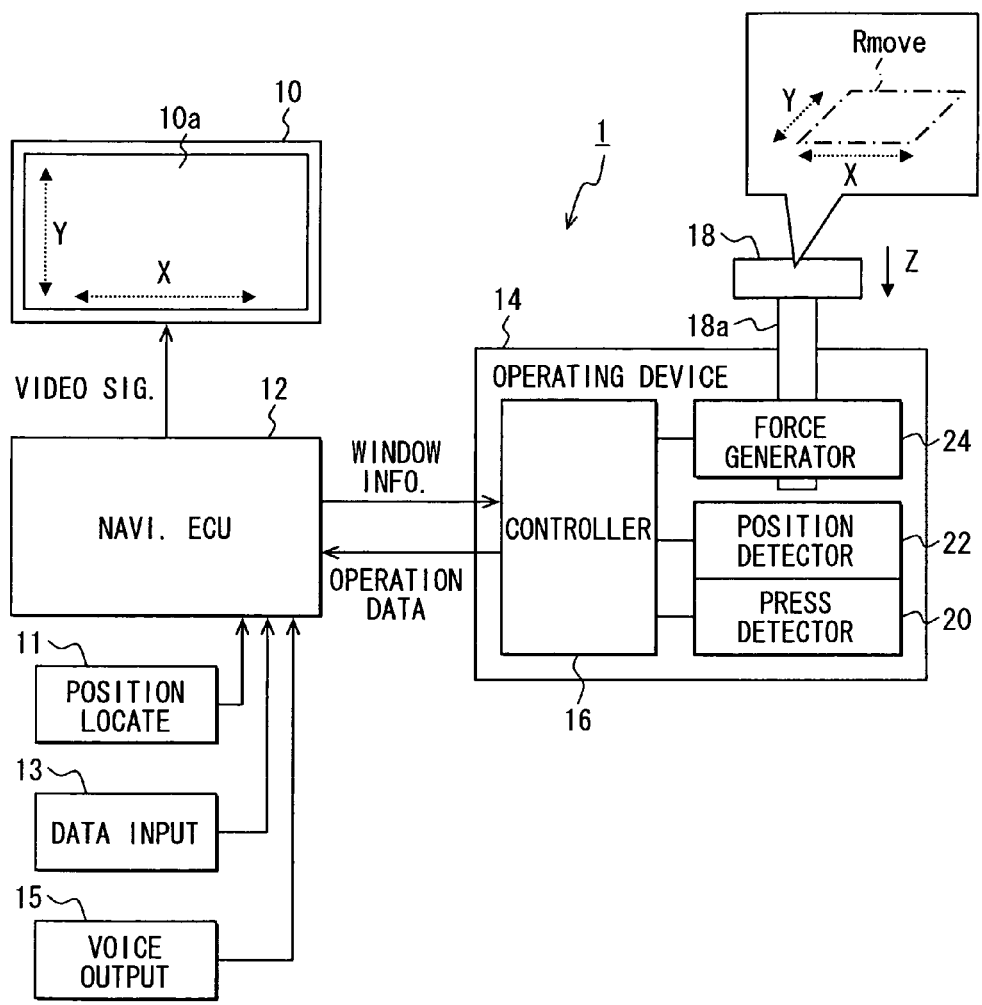
FIG. 1 is a block diagram illustrating a navigation apparatus.

FIG. 1 is a block diagram illustrating a navigation apparatus 1 according to one embodiment.

The navigation apparatus 1 is mountable to a movable body such as a vehicle and the like. As shown in FIG. 1, the navigation apparatus 1 includes a display device 10, a position location device 11 for detecting the present location of the vehicle, a navigation ECU (Electronic Control Unit) 12, an date input device 13 for inputting various date such as map date, programs and like stored in a storage medium, an operating device 14 for receiving user manipulation, and a voice output device 15.

Figure 2A:
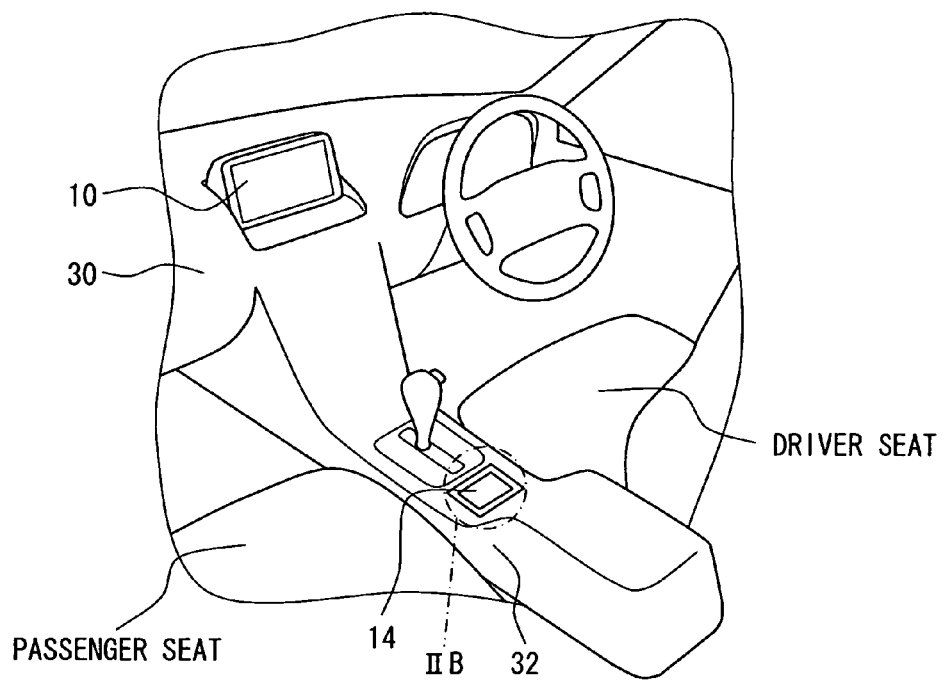
FIGS. 2A and 2B are diagrams illustrating an arrangement of a display device and an operating device in a vehicle compartment.
Figure 2B:
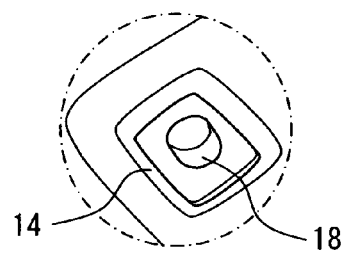

As shown in FIGS. 2A and 2B, the display device 10 is placed in a vehicle compartment and arranged on a dashboard 30 located forward of a driver seat and a passenger seat so that the display device 10 is between the driver seat and the front passenger seat. Due to this arrangement, the movement of driver viewpoint can be minimized when the driver takes a look at the display device 10. The operating device 14 is arranged on an upper surface of a center console 32, which is adjacent and lateral to the driver seat, so that a driver can easily manipulate the operating device 14 without extending his or her arm and without changing his or her position. The operating device 14 includes a manipulation knob 18 at an upper surface thereof. The manipulation knob 18 can be moved by a user (e.g., a driver of a vehicle).

The display device 10 may be a color display device having a display screen 10a such as a LCD (Liquid Crystal Display) or the like. The display device 10 can display various images and selection item images in accordance with input of image signals from the navigation ECU 12. For example, when the vehicle is traveling, the display device 10 displays a map image and various item images. The various item images include a present location mark showing the present location of the subject vehicle, a graphic representation of a guidance route to a destination, a graphic representation of name, a variety of symbol icons and the like. The display device 10 also can display a window, e.g., an operation window containing an icon for operation of the navigation apparatus 1. Such a window can function as GUI (Graphic User Interface). In one embodiment, the map image covers an area around a focus spot. The focus spot is, for example, the present location of the subject vehicle, the pointed spot and the like. Further, in response to movement of the focus spot, the map image may scroll to change the area covered by the map image.

The operating device 14 can act as a pointing device and a remote control device for inputting instructions for cursor movement direction and selection determination. The operating device 14 includes a manipulation knob 18 that a user (driver) can manipulate. The manipulation knob 18 has an axis part 18a. The manipulation knob 18 is movable generally along a two-dimensional plane perpendicular to the axis part 18a. In one embodiment, the display screen 10a has a rectangular shape, and a movable region $R_{move}$ of the manipulation knob 18 in the two-dimensional plane has a rectangular shape whose aspect ratio is generally equal to that of the display screen 10a. The X axis direction on the two-dimensional plane in the movable region $R_{move}$ is defined as one manipulation direction of the manipulation knob 18 that corresponds to a horizontal direction of the display screen 10a. The Y axis direction in the two-dimensional plane in the movable region $R_{move}$ is defined as another manipulation direction of the manipulation knob 18 that corresponds to a vertical direction of the display screen 10a. The manipulation knob 18 is also movable along a lower direction of the axis part 18a, the low direction illustratively corresponding to an arrow Z in FIG. 1. When a user stop applying a load to the manipulation knob 18 in the lower direction, the manipulation knob 18 returns to a home position by moving upward.

The operating device 10 further includes a control part 16, a pressing manipulation detection sensor 20, a position detection sensor 22, and a force generator 24. The control part 16 controls all or some of components of the operating device 10. The pressing manipulation detection sensor 20 detects the pressing down of the manipulation knob 18 in the Z axis direction. The pressing of the manipulation knob 18 in the Z direction may be referred to also as a selection manipulation. The position detection sensor 22 detects coordinates of position of the manipulation knob 18 in the X axis direction and the Y axis direction. The force generator 24 supports the axis part 18a of the manipulation knob 18 and applies a force to the axis part 18a. The force is, for example, a resistance force or an assist force, and depends on a load applied to the manipulation knob in the X-Y axes directions. The force generator 24 may constantly apply a certain resistance force to the manipulation knob 18 when the manipulation knob 18 is being moved by a user, in order to provide solid sense of manipulation.

The control part 16 makes coordinates on an operation target region of the window (e.g., operation window) one-to-once correspond to coordinates on the movable region of the manipulation knob 18 in the X and Y axes directions. In one embodiment, the operation target region of the window may be the whole region of the display screen 10a of the display screen. The control part 16 outputs, as operation data, the coordinate value of the manipulation knob 18 to the navigation ECU 12, and thereby, the control part 16 causes the display screen to display a cursor having an arrow shape at a position corresponding to the coordinate value of the manipulation knob 18. Through the above manners, when the user moves the manipulation knob 18 to a certain position in the movable region, the cursor on the window is accordingly moved to a corresponding position on the operation target region. It should be noted that the manipulation knob 18 is kept immobile and stays at its position when the manipulation knob 18 does not receive a load from a user.

When the manipulation knob 18 is pressed in the Z direction, in other words, when the selection manipulation is performed, the control part 16 determines that a selection instruction directed to a presently-pointed position on the window (e.g., operation window) is inputted, and the control part 16 outputs information on the selection manipulation to the navigation ECU 12.

The control part 16 receives window information (referred to also as operation window information) from the navigation ECU 12, and applies a force (e.g., a resistance force and an assist force) to the manipulation knob 18 by using the force generator 24 based on the window information, which defines content of the force.

The poison location device 11 includes a GPS (Global Positioning System) receiver, a gyroscope, and a vehicle speed sensor. The GPS receiver receives electro-magnetic wave transmitted from GPS satellites and detects coordinates of position of the subject vehicle. The gyroscope outputs a detection signal that depends on angular velocity of the subject vehicle. The vehicle speed sensor outputs a detection signal that depends on speed of the subject vehicle. The poison location device 11 detects the present location of the subject vehicle by using and complementing the above sensors.

The data input device 13 reads a variety of programs for operating the navigation apparatus 1 and a variety of data such as map data for navigation and the like, from a storage medium such as a DVD-ROM, a hard-disk drive or the like. The data input device 13 inputs the program and the data to the navigation ECU 12.

The voice output device 15 provides a user with a variety of information in the form of voice. Thus, the present embodiment can provide various information to a user via display of the display device 10 and voice from the voice output device 15.

The navigation ECU 12 can control the above-described devices and includes a CPU, a ROM, a RAM, an I/O and a bus line connecting the forgoing components. Thus, the navigation ECU 12 can act as a controller. The navigation ECU 12 performs various procedures based on programs read from the ROM or the data input device 13. The navigation ECU 12 can function as a selection item image display section or means, which causes the display device 10 to display a selection item image (e.g., icon) on the display screen 10a to receive a predetermined command execution instruction from a user. The selection item image includes: an on-map selection item image (e.g., on-map icon) that is superimposed on the map image and is scrollable together with the map image; and a fixed selection item image (e.g., fixed icon) that is fixedly displayed on the display screen 10a so as be arranged on the map image or in a periphery of the map image.

Procedures related to navigation include a map display procedure and a route guidance procedure. By performing the map display procedure, the navigation ECU 12 calculates the present location of the subject vehicle based on the detection signal from the position location device 11, reads a map image covering an area around the present location via the data input device 13, and display the map with a predetermined scale. Further, the navigation ECU 12 scrolls or scales the currently-displayed map image in response to movement of the present location or in response to a manual operation of changing the area covered by the map image. By performing the route guidance process, the navigation ECU 12 calculates an optimum route to a destination specified by a user, based on map data and the specified destination. The navigation ECU 12 displays the optimum route on the map image, and performs route guidance by, for example, outputting the voice and displaying route information on the display screen 10a. A method including cost calculation using the Dijkstra's algorithm may be used as a method of automatically calculating the optimum route to the destination.

[Explanation on Force Setting Procedure]

Explanation is given below on a force setting procedure.

The navigation ECU 12 causes the display device 10 to display a window acting as GUI (Graphic User Interface) on the display screen 10a. The navigation ECU 12 receives an operation from a user via the operating device 14 and determines that the coordinate inputted via the operating device 14 is a pointed position on the window. When the selection manipulation directed to an icon in the window is performed using the operating device 14, the navigation ECU 12 executes a function assigned to the icon.

The navigation ECU 12 receives an operation from a user via the operating device 14, and the navigation ECU 12 inputs coordinates of positions of icons and window information to the operating device 14. The window information defines distribution of attractive forces corresponding to the icons. The window information may be set as a data table with a matrix having elements that one-to-one correspond to coordinates of the movable region of the manipulation knob 18.

[Explanation on Force Setting Procedure for Operation Window]

Figure 4A:
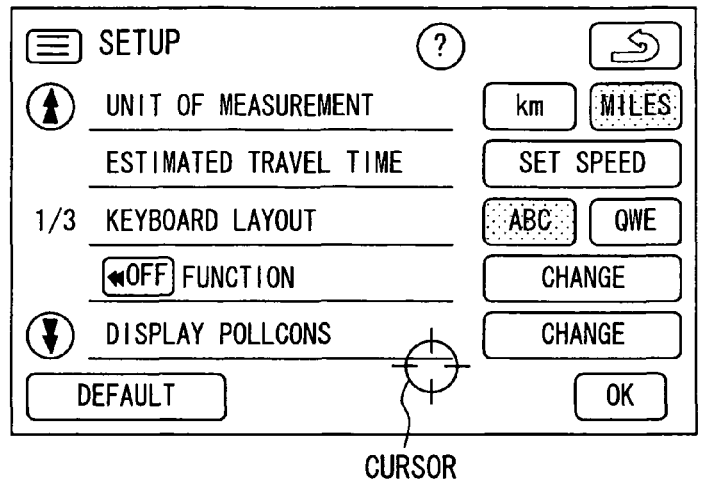
FIG. 4A is a diagram illustrating an operation window.

FIG. 4A illustrates one example of an operation window displayed by the display device 10. This operation window can acts a setup window for navigation apparatus settings, and contains icons acting as setting items, operation items or the like. Further, a cursor is displayed at the pointed position on the operation window, the pointed position corresponding to the position of the manipulation knob 18 of the operating device 14.

Figure 4B:
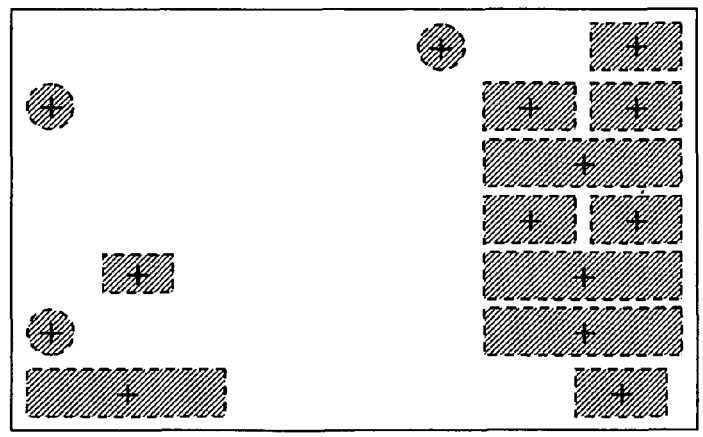
FIG. 4B is a diagram illustrating force distribution corresponding to the operation window illustrated in FIG. 4A.
Figure 4C:
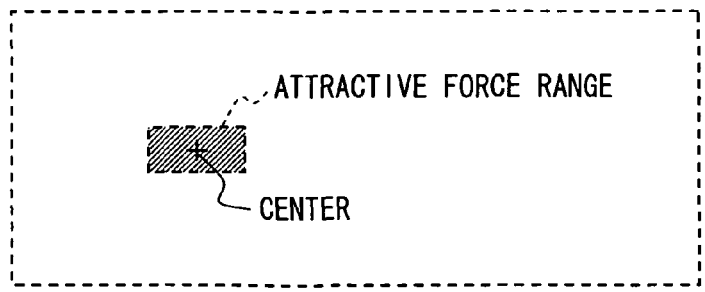
FIG. 4C is a diagram illustrating an attractive force generation range and its center as legends of FIG. 4B.

FIG. 4B is a diagram illustrating an attractive force distribution for the operation window in FIG. 4A, where the attractive force distribution is defined in the window information set by the navigation ECU 12. As shown in FIG. 4B, an attractive force generation range where an attractive force is generated is set on the operation window, so that the attractive force generation range corresponds to position and shape of the corresponding icon. In FIGS. 4B and 4C, the attractive force generation range is illustrated as the diagonal lines regions. The window information defines the attractive force to be applied to the manipulation knob 18. More specifically, when the coordinates of the position of the manipulation knob 18 correspond to an inside of the attractive force generation range, the attractive force (acting as an assist force) is applied to the manipulation knob 18 in such a direction that the pointed position is attracted toward the center (see "+" in FIG. 4B) of the attractive force generation range. In the above, the attractive force generation range is set larger than the size of the corresponding icon, and thus, the attractive force is generated from a time when the cursor reaches the vicinity of the icon. The above mariners enable a user to easily match the position pointed by the cursor and the position of the icon.

In one embodiment, the attractive force is set to every icon on the operation window, in which a map image is not displayed. The display screen can also display a map display window, in which the map image is displayed. On the map display window, an attractive force is set to a fixed icon while an attractive force is not set to an on-map icon as a general rule. The fixed icon may be an icon that is fixedly displayed on the display screen (10a) so as be arranged on the map image or in a periphery of the map image. The on-map icon may be an icon that is displayed on the map image so as to correspond to a certain location on the map image, and that is moved in accordance with scroll of the map image. It should be noted that the attractive force may be set to an on-map icon that satisfies a predetermined condition for force setting.

In the followings, explanation is given on a force setting procedure for the map display window.

[Explanation on Force Setting Procedure for Map Display Window]

Figure 3:
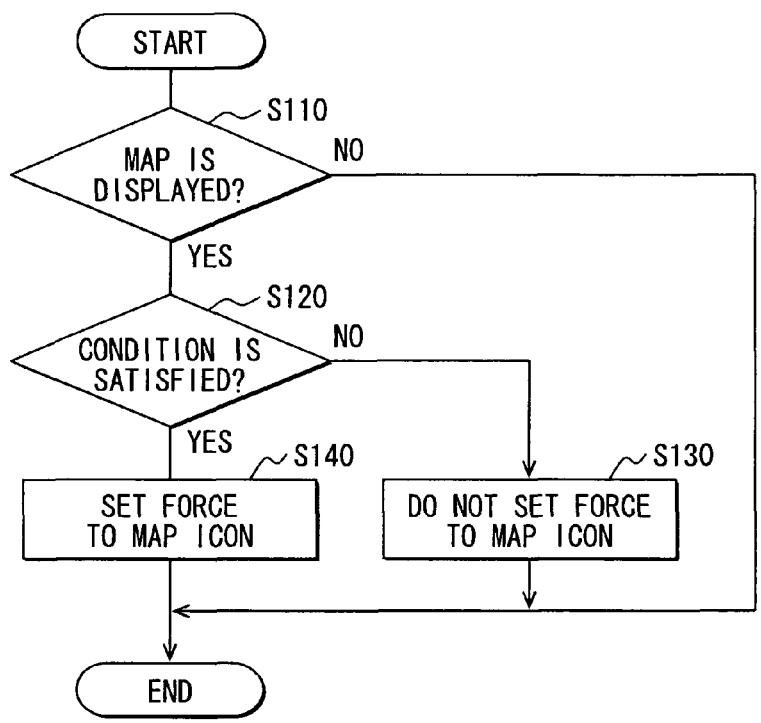
FIG. 3 is a flowchart illustrating a force setting procedure for a map display window.

FIG. 3 is a flowchart illustrating a force setting procedure to be performed by the navigation ECU 12 for the map display window. The navigation ECU 12 performing the force setting procedure can function as a force setting section or means.

At S110, the navigation ECU 12 determines whether a map image is displayed on a window that is currently being displayed. When it is determined that the map image is not displayed, the determination at S110 results in "NO" and the force setting procedure is ended. When it is determined that the map image is displayed, the determination at S110 results in "YES" and the process proceeds to S120. At S120, the navigation ECU 12 determines whether a predetermined condition for setting a force to the on-map icon is presently satisfied. In one embodiment, the predetermined condition for force setting includes the following four conditions.

(1) A first condition is that the number of on-map icons being displayed in the map display window is less than or equal to a predetermined number (e.g., 10).

(2) A second condition is that the map image is displayed with a scale larger than or equal to a predetermined scale (e.g., 800 m).

(3) A third condition is that a degree of importance assigned to a currently-displayed on-map icon is higher than a predetermined importance criterion. It should be noted that, in one embodiment, a degree of importance is preliminarily assigned to an icon. The on-map icon associated with high importance is, for example, an on-map icon associated with new arrival information or high emergency information, such as traffic jam information, traffic regulation information, weather information and the like. By preliminarily assigning high importance to such on-map icons, it becomes possible to use the high importance on-map icons as ones that satisfy the condition for setting a force.

(4) A fourth condition is that an on-map map is arranged within a predetermined range from the present location of the subject vehicle on the map image.

At S120, the determination may be made on all of the first to fourth conditions; in this case, when it is determined that at least one of the first to fourth conditions is presently satisfied, the determination at S120 results in "YES" and the process proceeds to S140. Alternatively, at S120, the determination may be made on one or more of the first to fourth conditions; in this case, the navigation apparatus 1 may be configured to enable a user to preliminarily set which one or ones of the first to fourth conditions are used in the determination at S120. Alternatively, none of the first to fourth conditions may be used in the determination at S120 so that the process at S120 is skipped; in this case, the process proceeds to S130 after the determination at S110 results in "YES".

When it is determined at S120 that the condition for force setting is not presently satisfied, corresponding to "NO" at S120, the process proceeds to S130. At S130, the force distribution is set taking into account an arrangement of icons on the window, and the window information containing information on the force distribution is inputted to the operating device 14.

At S130, the force distribution is set in the following ways for instance.

A resistance force is set to a predetermined region extending along a boundary between an on-map icon display region and a fixed icon display region of the window, so that the resistance force provides a resistance against the manipulation of the manipulation knob 18 that causes the pointed position to move across the boundary. In the above, the on-map icon display region is a part of the window and provides a region where the on-map icon is superimposed on the map image. The fixed icon display region is another part of the window located in a periphery of the on-map icon display region and provides a region where the fixed icon is displayed. The navigation ECU 12 sets the attractive force to every icon displayed on the fixed icon display region so that the attractive force corresponds to the position and the shape of the icon. The navigation ECU 12 however does not set the attractive force to an icon displayed on the on-map icon display region.

The resistance force, which is set to the boundary between the on-map icon display region and the fixed icon display region, is used to provide a user with feeling as if there were a divider wall between the on-map icon display region and the fixed icon display region. It should be noted that the resistance force is set to have an upper limit magnitude. When the load exceeding the resistance force with the upper limit magnitude is applied to the manipulation knob 18, the pointed position corresponding to the position of the manipulation knob 18 moves across the boarder.

Figure 5A:
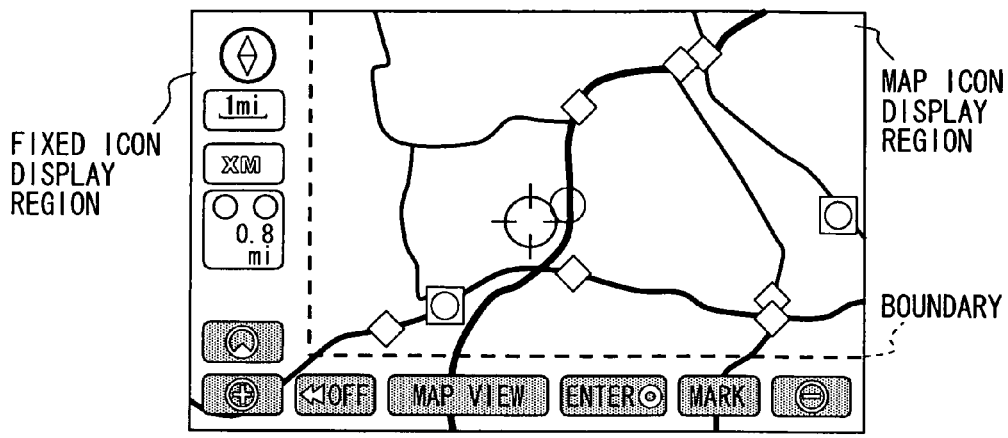
FIG. 5A is a diagram illustrating a map display window.
Figure 5B:
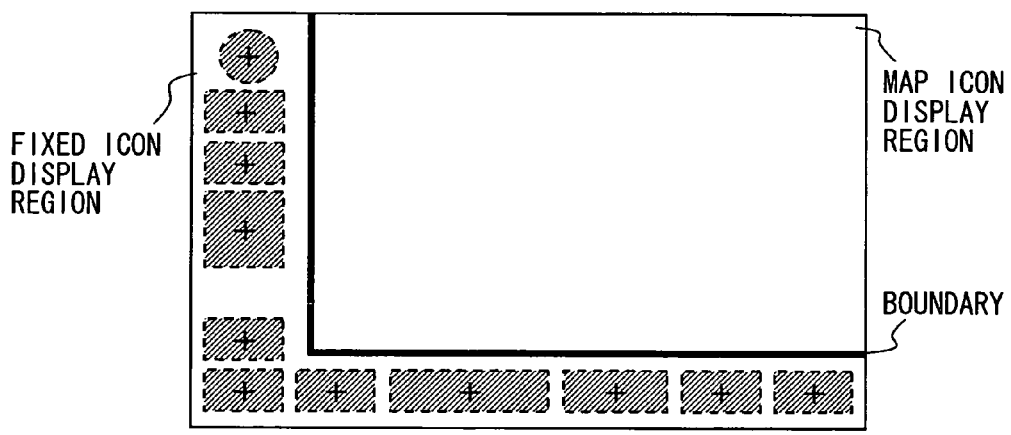
FIG. 5B is a diagram illustrating force distribution corresponding to the map display window illustrated in FIG. 5A.
Figure 5C:
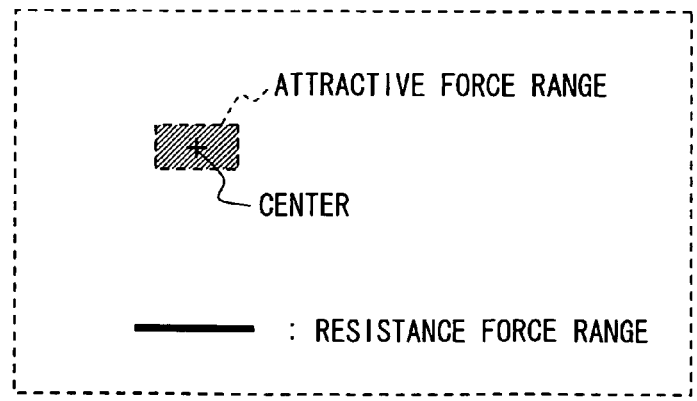
FIG. 5C is a diagram illustrating an attractive force generation range and a resistance force generation range as legends of FIG. 5B.

Referring to FIGS. 5A to 5C, explanation is given below on a concrete example of the force distribution to be set at S130. FIG. 5A is a diagram illustrating one exemplary map display window displayed by the display device 10. FIG. 5B is a diagram illustrating force distribution that corresponds to the map display window in FIG. 5A and that is defined in the window information to be set by the navigation ECU 12. FIG. 5C is a diagram illustrating an attractive force generation range and a resistance force generation range in FIG. 5B.

As shown in FIG. 5A, the map image is fully displayed on the map display window. In the map display window, the on-map icon display region is set to a part of the map display window, the part being located upper right so as to cover the center of the map display window. Further, the fixed icon display region is set to another part of the map display window, the another part being located in a periphery of the on-map icon display region so as to have an L-shape and extend along the left edge and the lower edge of the map display window. It should be noted that, although the boarder between the on-map icon display region and the fixed icon display region is shown as a dotted line in FIG. 5A, the boarder may not be visualized on the map display window.

The on-map icon is arranged on the on-map icon display region so as to correspond to a particular position on the map image, and the on-map icon is movable in accordance with scroll of the map image. The on-map icon includes an icon used for displaying information on traffic regulation of roads (e.g., traffic jam information, road work information, accident information) and an icon used for displaying information on a particular facility on map.

The fixed icon is arranged on the fixed icon display region, and is fixedly displayed on the map display window regardless of the scroll of the map image. The fixed icon includes an icon used for performing various basic operations of the navigation apparatus 1, such as changing map scale of the map, changing area shown in the map, changing design of the map, switching the window, and the like.

When the force distribution is set at S130 to the map display window illustrated in FIG. 5A, the force distribution illustrated in FIG. 5B is set. More specifically, for every fixed icon arranged in the fixed icon display region, an attractive force generation range (illustrated as a diagonal-lines region in FIG. 5B) is set to correspond to the position and the shape of the fixed icon. The force distribution is set such that, when the manipulation causes the manipulation knob 18 to be positioned at a coordinate that corresponds to an inside of the attractive force generation range, the assist force (i.e., attractive force) is applied to the manipulation knob 18 in such a direction that the pointed position is attracted toward the center (see "+" in FIGS. 5B and 5C) of the attractive force generation range In the above, the attractive force generation range is set larger than the size of the corresponding fixed-icon. According to the above setting, the attractive force is generated from a time when the cursor reaches the vicinity of the fixed icon. A use can therefore easily match the position pointed by the cursor and the position of the fixed icon. In the example shown in FIG. 5B, the attractive force is not set to any on-map icon arranged in the on-map icon display region.

The resistance force, which can act as if it were a divider wall between the on-map display region and the fixed icon display region, is set to an L-shaped region extending along the boundary between the on-map display region and the fixed icon display region. The L-shaped region provides a resistance force generation range. When the pointed position is in the resistance force generation range, the resistance force is applied to the manipulation knob 18 so that the resistance force resists against the manipulation of the manipulation knob 18 that causes the pointed position to move across the boundary.

Explanation now returns to the flowchart in FIG. 3.

When it is determined at S120 that the condition for force setting is presently satisfied, the determination at S120 results in "YES" and the process proceeds to S140. At S140, the force distribution is set taking into account an arrangement of icons on the window, and the window information defining information on the force distribution is inputted to the operating device 14. At S140, the navigation ECU 12 sets the resistance force to the predetermined region extending along the boundary between the on-map icon display region and the fixed icon display region so that the resistance force resists against the manipulation that causes the pointed position to move across the boundary. Further, the navigation ECU 12 sets an attractive force to an individual fixed-icon arranged in the fixed icon display region so that the attractive force corresponds to the position and the shape of the fixed icon. Content of the resistance force and content of the attractive force that are set at S140 are similar to those set at S130.

Further, the attractive force is set to, of the on-map icons arranged in the on-map icon display region, the on-map icon that is determined at S120 to satisfy the condition for force setting (cf. the above-described first to fourth conditions). More specifically, when it is determined that the first or second condition is satisfied, the attractive force is set to all of the on-map icons displayed on the window. When it is determined that the third condition is satisfied, the attractive force is set to, of the on-map icons displayed on the window, the on-map icon whose degree of importance assigned is higher than the predetermined importance criterion. When it is determined that the fourth condition is satisfied, the attractive force is set to, of the on-map icons displayed on the window, the on-map icon that is arranged within a predetermined range from the present location of the subject vehicle. In the above, property of the attractive force set to the on-map icon may be substantially similar to that set to the fixed icon.

Figure 6A:
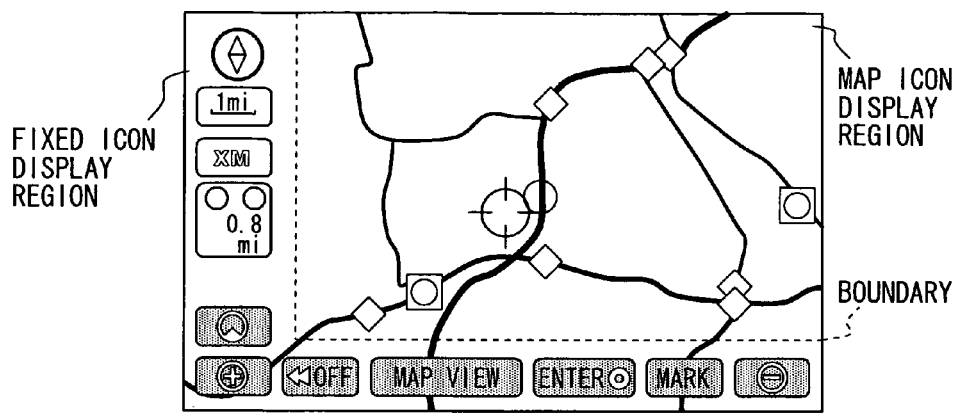
FIG. 6A is a diagram illustrating another map display window.
Figure 6B:
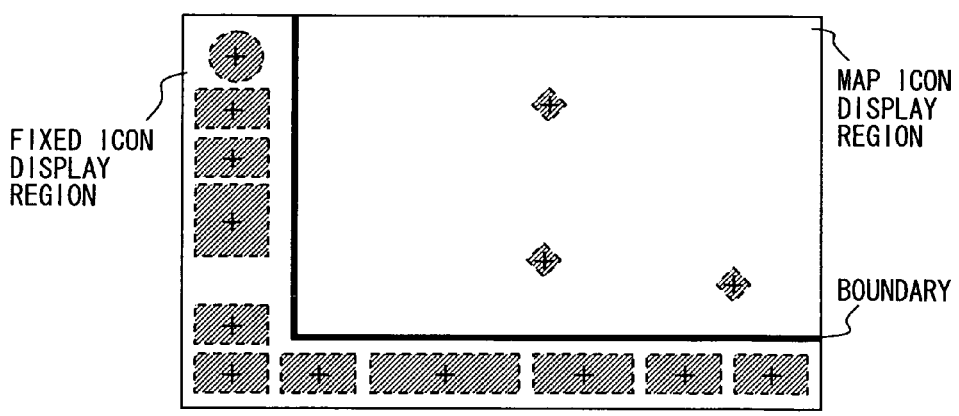
FIG. 6B is a diagram illustrating force distribution corresponding to the map display window illustrated in FIG. 6A.
Figure 6C:
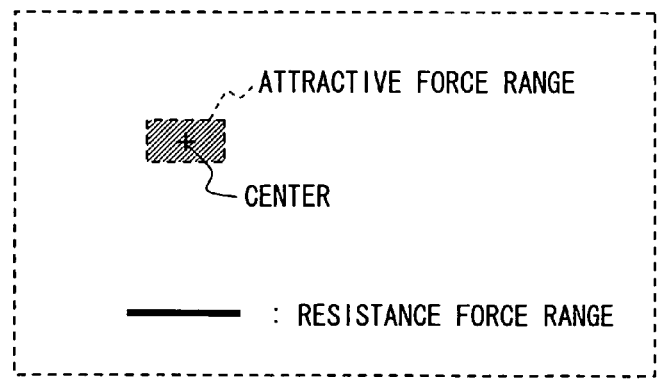
FIG. 6C is a diagram illustrating an attractive force generation range and a resistance force generation range as legends of FIG. 6B.

Referring to FIGS. 6A to 6C, explanation is given below on a concrete example of the force distribution to be set at S140. FIG. 6A is a diagram illustrating one exemplary map display window displayed by the display device 10. FIG. 6B is a diagram illustrating force distribution that corresponds to the map display window in FIG. 6A and that is defined in the window information to be set by the navigation ECU 12. FIG. 6C is a diagram illustrating an attractive force generation range and a resistance force generation range in FIG. 6B.

As shown in FIG. 6A, the map image is fully displayed in the map display window. In the map display window, an on-map icon display region is set to a part of the map display window, the part being located upper right so as to cover the center of the map display window. Further, a fixed icon display region is set to another part of the map display window, the another part being located in a periphery of the on-map icon display region so as to have an L-shape and extend along the left edge and the lower edge of the map display window. It should be noted that, although the boarder between the on-map icon display region and the fixed icon display region is shown as a dotted line in FIG. 6A, the boarder may not be visualized on the map display window.

The on-map icon is arranged in the on-map icon display region so as to correspond to a particular position on the map image. The on-map icon is movable in accordance with scroll of the map image. The on-map icon includes an icon used for displaying information on traffic regulation of roads (e.g., traffic jam information, road work information, accident information) and an icon used for displaying information on a particular facility on map.

The fixed icon is arranged in the fixed icon display region so as to be fixedly displayed on the map display window regardless of the scroll of the map image. The fixed icon includes an icon used for performing various basic operations of the navigation apparatus 1, such as changing the map scale of the map image, changing the area shown in the map image, changing design of the map image, switching the window, and the like.

When the force distribution is set at S140 to the map display window illustrated in FIG. 6A, the force distribution illustrated in FIG. 6B is generated. More specifically, for an individual fixed icon arranged in the fixed icon display region, an attractive force generation range (illustrated as a diagonal-lines region in FIG. 6B) is set to correspond to the position and the shape of the icon. Further, for some of on-map icons arranged in the on-map icon display region, an attractive force generation range (illustrated as a diagonal-lines region in FIG. 6B) is set to correspond to the position and the shape of the on-map icon. It should be noted that the attractive force is set to, of the on-map icons, only the on-map icon satisfying at least any one of the first to fourth conditions for force setting.

In the above, the window information defines the attractive force to be applied to the manipulation knob 18. More specifically, when the coordinates of the position of the manipulation knob 18 correspond to an inside of the attractive force generation range, the attractive force (acting as an assist force) is applied to the manipulation knob 18 in such a direction that the pointed position is attracted toward the center (see "+" in FIG. 4B) of the attractive force generation range. In the above, the attractive force generation range is set larger than the size of the corresponding fixed-icon. Due to this setting, the attractive force is generated from a time when the cursor reaches the vicinity of the icon. A use can easily match the position pointed by the cursor and the position of the icon.

Further, the resistance forces acting as if it were a divider wall between the on-map display region and the fixed icon display region is set to an L-shaped region extending along the boundary between the on-map display region and the fixed icon display region. The L-shaped region provides a resistance force generation range. When the pointed position is in the resistance force generation range, the resistance force is applied to the manipulation knob 18 so that the resistance force resists against the manipulation that causes the pointed position to move across the boundary.

[Advantages]

The navigation apparatus 1 of one embodiment has the followings advantages.

(1) A function, for basic operation of the navigation apparatus 1 and the like is typically assigned to the fixed icon such as operation menu and the like. Such fixed icons are usually arranged in an orderly manner, in the periphery of the map image or the like with due consideration of design and operability. Thus, the attractive force is set to the fixed icon so that the pointed position, which corresponds to the position of the manipulation knob 18, is attracted toward the position of the fixed icon. It is thereby possible to facilitate the pointing to the fixed icon and provide operability comfortable for a user. Further, since the fixed icon is arranged with due consideration of the design and the operability, there does not arise a difficulty that the pointed position is casually attracted contrary to user intentions.

A function for providing information on roads and facilities on a map is typically assigned to the on-map icon. Since such on-map icons are arranged to correspond to particular positions on the map image, the arrangement of on-map icons depends on content of the map. Thus, the on-map icons are not always arranged in an orderly manner. Further, depending on content of the map, many on-map icons may be displayed on the display screen 10a at once. In view of the above, the attractive force is not set to the on-map icon as general rule, so that the pointed position, which corresponds to the position of the manipulation knob 18, is attracted to the position of the on-map icon. Thereby, it is possible to prevent the pointed position from being absorbed contrary to user intentions, and it is possible to avoid worsening operability. Further, through the above manners, it becomes possible to smoothly perform an operation of moving a cursor on the map image for the purpose other than the pointing to and the selecting of the on-map icon, providing a suitable manner.

Further, it becomes unnecessary to set again date of the force to many on-map icons every time the on-map icons are moved in accordance with the scroll of the map image. It is possible to reduce the processing load regarding the force data setting.

(2) By setting the resistance force, which resists against the manipulation causing the pointed position to move across the boarder between the fixed icon display region and the on-map ion display region, it becomes possible for a user to distinguish the fixed icon display region and the on-map icon display region from each other tactually via the manipulation of the manipulation knob 18, and thereby, it is possible to improve operability.

(3) When the number of on-map icons is small and the on-map icons are not overcrowded, the operability may not be reduced on the map image and the processing load on the force data setting may not become excessive. In view of the above, the condition for force setting includes a condition that the number of on-map icons being displayed on the display screen is less than or equal to a predetermined number. When the above condition is satisfied, the attractive force may be set to every on-map icon. According to the above manner, it is possible to facilitate an operation of pointing to an on-map icon on the map image.

(4) When the map is displayed with a larger scale (zoomed) larger than a predetermined scale, area of a region covered by the map image in the window becomes smaller, and the number of on-map icons on the map image becomes relatively smaller and intervals between the on-map icons become larger. In such a case, the operability on the map image may not be reduced and the processing load on the force data setting may not become excessive. In view of the above, the condition for force setting includes a condition that the map image is displayed with a large scale larger than a predetermined scale. If this condition is satisfied, the attractive force may be set to the or-map icons. Due to this manner, it is possible to facilitate an operation of pointing to an icon on the map image.

(5) When the attractive force is set to, of many on-map icons, only the on-map icon to which a high-importance function is assigned, the operability on the map image may not be reduced and the processing load on the force data setting may not be excessive. In view of the above, the condition for force setting includes a condition that the displayed on-map icons include an on-map icon whose degree of importance is higher than a predetermined importance criterion. The attractive force may be set to only the on-map icon whose degree of importance is higher than the predetermined importance criterion. According to the above manner, it is possible to facilitate an operation of pointing to an icon on the map image.

(6) When the attractive force is set to, of many on-map icons, only the on-map icon arranged around the present location of the subject vehicle, the operability on the map image may not be reduced and the processing load on the force data setting may not become excessive. In view of the above, the condition for force setting includes a condition that the on-map icon is arranged within a predetermined range from the present location of the subject vehicle. The attractive force is set to only the on-map icon arranged within a predetermined range from the present location of the subject vehicle. According to the above manner, it is possible to facilitate an operation of pointing to the icon on the map image. Further, since it is considered that the on-map icon arranged around the present location of the subject vehicle has a high degree of utility for a user, it is possible to considerably improve user-convenience by setting the attractive force to such on-map icons.

The above embodiments can be modified in various ways, examples of which are described below.

In the above embodiment, the first to fourth conditions are used as examples of the predetermined condition for force setting.

Alternatively, the predetermined condition for force setting may include a condition that frequency of use of the on-map icon is higher than a predetermined frequency. The attractive force may be set to the on-map icon whose frequency of use is higher than the predetermined frequency, so that the attractive force causes the pointed position around the on-map icon to be attracted toward the position of the on-map icon.

Alternatively, the predetermined condition for force setting may include a condition that the on-map icon is preliminarily selected as an attractive force target. The attractive force may be set to the on-map icon that is preliminarily selected as the attractive force target, so that the attractive force causes the pointed position around the force attractive target to be attracted toward the position of the attractive force target.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

What is claimed is:

1. A navigation apparatus mounted to a movable body, configured to cause a display device to display a map image around a focus spot, and configured to scroll the map image to change a displayed area of the map image in response to movement of the focus spot, the navigation apparatus comprising:
   a selection item image display section that causes the display device to display a selection item image for receiving a predetermined command execution instruction from a user, wherein the selection item image includes
      an on-map selection item image that is superimposed on the map image and is scrolled together with the map image, and
      a fixed selection item image that is fixedly displayed on a display screen and is arranged around or on the map image;
   a remote control device that includes
      a manipulation member that is movable in response to user manipulation of the manipulation member to input a movement instruction to the display device so that arbitrary position on the display screen of the display device is pointed to by the manipulation member remotely from the display device by remote control; and
      an assist force setting section that sets content of an assist force to be applied to the manipulation member, based on an arrangement of the selection item image on the display screen,
wherein:
the remote control device further includes
   an assist force generator that applies the assist force to the manipulation member against the user manipulation of the manipulation member according to the content of the assist force set by the assist force setting section; and
the assist force setting section sets the assist force such that when the pointed position, which is the position pointed to by the manipulation member, is located in the vicinity of the fixed selection item image, the assist force attracts the pointed position toward a displayed position of the fixed selection item image, while the assist force that attracts the pointed position, which is the position pointed to by the manipulation member, toward a displayed position of the on-map selection item image is not set to the on-map selection item image by the assist force setting section.

2. The navigation apparatus according to claim 1, wherein:
the assist force setting section distinguishes a fixed item display region of the display screen, in which the fixed selection item image is displayed, from an on-map item display region of the display screen, in which the on-map selection item image is displayed; and
the assist force setting section further sets the assist force along a boundary between the fixed item display region and the on-map item display region such that when the manipulation of the manipulation member causes the pointed position, which is the position pointed to by the manipulation member, to move across the boundary, the assist force resists against the manipulation of the manipulation member.

3. The navigation apparatus according to claim 1, wherein:
only when a predetermined condition for assist force setting is satisfied, the assist force setting section further sets the assist force to the on-map selection item image meeting the predetermined condition for assist force setting, such that
   in the vicinity of the on-map selection item image meeting the predetermined condition for assist force setting, the assist force attracts the pointed position, which is the position pointed to by the manipulation member, toward a displayed position of the on-map selection item image meeting the predetermined condition for assist force setting; and
when the predetermined condition for assist force setting is not satisfied, the assist force that attracts the pointed position toward the on-map selection item image is not set to the on-map selection item image by the assist force setting section.

4. The navigation apparatus according to claim 3, wherein:
the predetermined condition for assist force setting is satisfied when a number of on-map selection item images being displayed within the display screen is less than or equal to a predetermined number; and
when the number of on-map selection item images being displayed within the display screen is less than or equal to the predetermined number, the assist force setting section sets the assist force to each on-map selection item image such that the assist force attracts the pointed position, which is the position pointed to by the manipulation member, toward the displayed position of the each on-map selection item image.

5. The navigation apparatus according to claim 3, wherein:
the predetermined condition for assist force setting is satisfied when scale of the displayed map image is larger than a predetermined scale; and
when the scale of the displayed map image is larger than the predetermined scale, the assist force setting section sets the assist force to each on-map selection item image arranged on the map image such that the assist force attracts the pointed position, which is the position pointed to by the manipulation member, toward the displayed position of the on-map selection item image.

6. The navigation apparatus according to claim 3, wherein:
the on-map selection item image has a preliminarily-assigned degree of importance depending on content of the on-map selection item image;
the predetermined condition for assist force setting is satisfied when the on-map selection item image having the degree of importance higher than a predetermined criterion is arranged on the displayed display screen; and
when the on-map selection item image having the degree of importance higher than the predetermined criterion is arranged on the displayed display screen, the assist force setting section sets the assist force to each on-map selection item image having the degree of importance higher than the predetermined criterion, such that the assist force attracts the pointed position, which is the position pointed to by the manipulation member, toward the displayed position of the on-map selection item image having the degree of importance higher than the predetermined criterion.

7. The navigation apparatus according to claim 3, wherein:
the predetermined condition for assist force setting is satisfied when the on-map selection item image is arranged within a predetermined range from a present location of the movable body; and
when the on-map selection item image is arranged within the predetermined range from the present location of the movable body, the assist force setting section sets the assist force to each on-map selection item image arranged within the predetermined range, such that the assist force attracts the pointed position, which is the position pointed to by the manipulation member, toward the displayed position of the on-map selection item image.

8. The navigation apparatus according to claim 3, wherein:
the predetermined condition for assist force setting is satisfied when frequency of use of the on-map selection item image is higher than a predetermined frequency; and
when the frequency of use of the on-map selection item image is higher than the predetermined frequency, the force setting section sets the assist force to each on-map selection item image whose frequency of use is higher than the predetermined frequency, such that the assist force attracts the pointed position, which is the position pointed to by the manipulation member, toward the displayed position of the on-map selection item image.

9. The navigation apparatus according to claim 3, wherein:
the predetermined condition for force setting is satisfied when the on-map selection item image is preliminarily selected as an assist force target item; and
when the on-map selection item image is preliminarily selected as the assist force target item, the force setting section sets the assist force to each on-map selection item image selected as the assist force target item, such that the assist force attracts the pointed position, which is which is the position pointed to by the manipulation member, toward the displayed position of the assist force target item.

* * * * *